(12) United States Patent
Dieckmann et al.

(10) Patent No.: US 11,066,112 B2
(45) Date of Patent: Jul. 20, 2021

(54) REAR SPOILER DEVICE FOR A UTILITY VEHICLE

(71) Applicant: WABCO EUROPE BVBA, Brussels (BE)

(72) Inventors: Thomas Dieckmann, Pattensen (DE); Umut Gencaslan, Hannover (DE); Gerd Schünemann, Laatzen (DE); Gandert Marcel Rita Van Raemdonck, Delft (NL); Roy Veldhuizen, Rotterdam (NL)

(73) Assignee: WABCO Europe BVBA, Brussels (BE)

( * ) Notice: Subject to any disclaimer, the term of this patent is extended or adjusted under 35 U.S.C. 154(b) by 53 days.

(21) Appl. No.: 16/490,961

(22) PCT Filed: Mar. 21, 2018

(86) PCT No.: PCT/EP2018/057169
§ 371 (c)(1),
(2) Date: Sep. 4, 2019

(87) PCT Pub. No.: WO2018/177841
PCT Pub. Date: Oct. 4, 2018

(65) Prior Publication Data
US 2020/0023909 A1    Jan. 23, 2020

(30) Foreign Application Priority Data

Apr. 1, 2017 (DE) .......................... 102017003191.6

(51) Int. Cl.
*B62D 35/00* (2006.01)

(52) U.S. Cl.
CPC ......... *B62D 35/001* (2013.01); *B62D 35/007* (2013.01)

(58) Field of Classification Search
CPC ............................. B62D 35/001; B62D 35/007
See application file for complete search history.

(56) References Cited

U.S. PATENT DOCUMENTS

| | | | |
|---|---|---|---|
| 2004/0119319 | A1 | 6/2004 | Reiman et al. |
| 2007/0126261 | A1 | 6/2007 | Breidenbach |

(Continued)

FOREIGN PATENT DOCUMENTS

| | | | |
|---|---|---|---|
| DE | 10228658 | A1 | 1/2004 |
| DE | 202009014476 | U1 | 2/2010 |

(Continued)

OTHER PUBLICATIONS

International Search Report from corresponding PCT Application No. PCT/EP2018/057169, dated Jun. 26, 2018 (4 pages).

*Primary Examiner* — Lori L Lyjak
(74) *Attorney, Agent, or Firm* — Dickinson Wright PLLC

(57) ABSTRACT

A rear spoiler device for a utility vehicle has: a first roof air-guiding element for attaching to a first rear door and a second roof air-guiding element for attaching to a second rear doo. The two roof air-guiding elements are adjustable between a folded-in basic position and a driving position for the aerodynamic extension of the contour of a roof surface. A manual adjustment device for adjusting the first roof air-guiding element between the basic position and driving position. A coupling device is provided for coupling the pivoting movements of the roof air-guiding elements. The coupling device carries along the second roof air-guiding element during the adjustment of the first roof air-guiding element. The coupling device may be an overlapping element.

17 Claims, 2 Drawing Sheets

(56) References Cited

U.S. PATENT DOCUMENTS

| | | | |
|---|---|---|---|
| 2009/0200834 A1 | 8/2009 | Vogel et al. | |
| 2011/0084516 A1 | 4/2011 | Smith et al. | |
| 2016/0068200 A1* | 3/2016 | Dieckmann | B62D 35/007 296/180.4 |
| 2016/0332680 A1* | 11/2016 | Dieckmann | B62D 35/007 |
| 2017/0021873 A1* | 1/2017 | Dieckmann | B62D 35/001 |

FOREIGN PATENT DOCUMENTS

| | | |
|---|---|---|
| DE | 102009014860 A1 | 10/2010 |
| WO | 2014210360 A1 | 12/2014 |

\* cited by examiner

REAR SPOILER DEVICE FOR A UTILITY VEHICLE

TECHNICAL FIELD

The present disclosure relates to a rear spoiler device for a utility vehicle.

BACKGROUND

The vehicle in this case has two rear doors which can each be swung open rearward and outward, wherein they are pivotable forward in particular from a closed position by more than 180°, e.g. approximately 250° or 270°, in order to be placed, and optionally to be locked, against the side walls of a box-shaped body of the utility vehicle.

Rear spoiler devices of this type are provided in particular on utility vehicles having a blunt rear or substantially box-shaped body; the rear spoiler device here, together with the extended roof air-guiding elements, provides an aerodynamic extension of the contour rearward in order at least to reduce the separation vortices at the blunt separation edge. A rear spoiler device of this type generally has roof air-guiding elements which can be attached, e.g. to the rear door and are adjustable between a folded-in basic position, in which they lie flat against the rear door, and an unfolded driving position.

US 2004/0119319 A1 shows a vehicle having a rear spoiler device of this type. The roof air-guiding elements extend the roof surface of the vehicle rearward and can be folded in inward. In the retracted state, the rear spoiler device can be pivoted away together with the rear doors and can open up the loading space.

US 2007/0126261 A1 shows a further rear spoiler device which is attached to the side walls of the vehicle and permits folding in the longitudinal direction of the vehicle, wherein a rear spoiler device of this type fills the entire rear surface of the vehicle.

However, rear spoiler devices of this type are frequently complicated to fit and do not permit simple access to the rear doors of the utility vehicle.

Further pivotable or adjustable arrangements of air-guiding elements are also shown, e.g. in DE 10 2009 014 860 A1, DE 20 2009 014 476 U1 and DE 102 286 58 A1.

However, the adjustment of the two roof air-guiding elements is relatively complicated. The user generally has to adjust both roof air-guiding elements via adjustment devices, such as, for example, pull-push struts, in order to adjust the rear spoiler device into the driving position. In a corresponding manner, in the case of pneumatic or electric systems, two adjustment devices have to be provided for the two roof air-guiding elements.

SUMMARY

The present invention is therefore based on the object of providing a rear spoiler device for a utility vehicle, which is formed with relatively little outlay and provides reliable adjustment.

The present disclosure is based on the finding that the two roof air-guiding elements each perform a folding movement and a pivoting movement, which can, in principle, also be combined with each other. A coupling device is therefore provided, which couples the pivoting movement and folding movement of the roof air-guiding elements. The coupling device is provided here on a first roof air-guiding element, e.g. the left roof air-guiding element, which couples or carries along the other, second roof air-guiding element during the pivoting movement of the first roof air-guiding element.

The user, therefore, merely has to adjust the first roof air-guiding element actively from the basic position into the driving position, as a result of which, the second roof air-guiding element is pivoted at the same time because of the coupling device.

The coupling is accomplished in particular by an overlap between the roof air-guiding elements in which the actively adjusted first roof air-guiding element projects under an inner edge of the second roof air-guiding element. In this case, the coupling device of the first roof air-guiding element projects under the second roof air-guiding element; and it is also possible for a mating coupling device, which interacts with the (first) coupling device, to be provided on the second roof air-guiding element.

The coupling device and the mating coupling device may be plastic brackets or profiles, or metal brackets or profiles, e.g. with the coupling device and the mating coupling device in the form of U-shaped or S-shaped profiles, which are fastened respectively to individual roof air-guiding elements, thereby securely engaging one another by the interlocking of angular or profiled regions.

The coupling of the roof air-guiding elements does not impair the regular use of the rear doors. When the rear spoiler device is retracted, i.e. when the roof air-guiding elements rest on the rear doors, the user opens the rear doors in the customary manner. The user first opens the right rear door with the attached second roof air-guiding element and subsequently pivots the open rear door outward and forward to lie against the side wall. The coupling device and mating coupling device easily lift off from each other in the basic position, and therefore, there is no interference in the opening of the rear doors. Specifically, in the case of profiled engagements or angular engagements, there is preferably a non-latching support, and therefore the right rear door with the attached second roof air-guiding element easily lifts off from the first roof air-guiding element.

After the first rear door is opened, the user subsequently opens the second rear door with the attached second roof air-guiding element and can also pivot, in the same outward and forward direction, the door such that it lies against the side wall.

To adjust the rear spoiler into the driving position, the user therefore merely has to actuate the one adjustment device for actively pivoting the first roof air-guiding element from the basic position into the driving position, as a result of which, the second roof air-guiding element is carried along and is likewise pivoted into the driving position. During the resetting operation, the user correspondingly resets the first roof air-guiding element, which generally pivots downward by gravitational force alone; the second roof air-guiding element likewise pivots downward into the basic position solely because of its gravitational force, and need not be carried by the first roof air-guiding element.

A simple and cost-effective system, in particular of the coupling device and optionally the mating coupling device, is therefore provided, which ensures reliable adjustment with little outlay, namely with a single adjustment device, wherein further access to the loading space via the rear doors and the adjustment of the rear doors is not interfered with by this system.

BRIEF DESCRIPTION OF THE DRAWINGS

The invention will be explained in more detail below by way of a number of embodiments with reference to the attached drawings, in which.

The drawings provided herewith are for purely illustrative purposes and are not drawn to scale or intended to limit the scope of the present invention.

DETAILED DESCRIPTION

Figure 1:
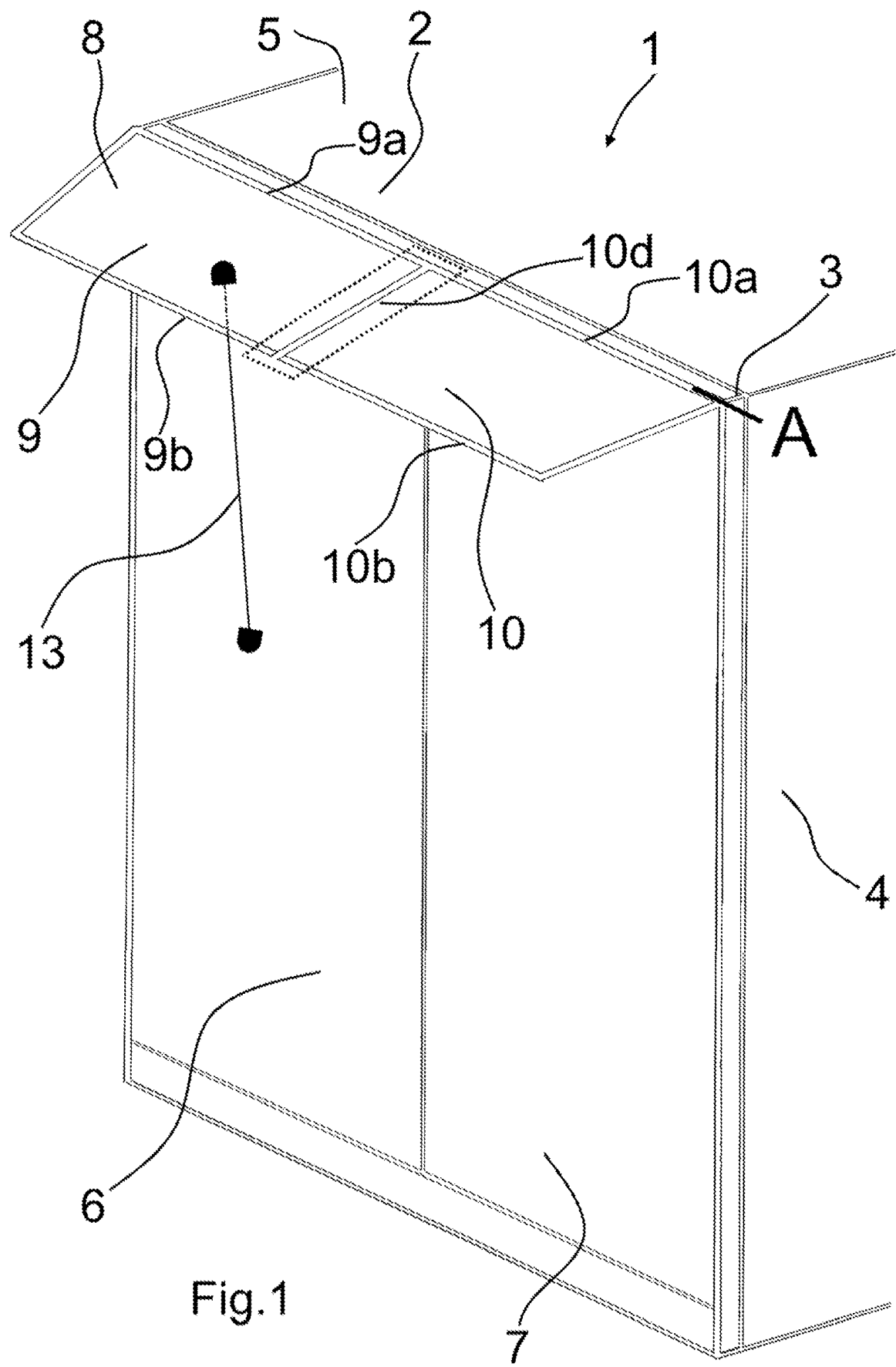
FIG. 1 shows a perspective rear view of a utility vehicle having a rear spoiler device according to one embodiment of the invention in the driving position.
Figure 2:
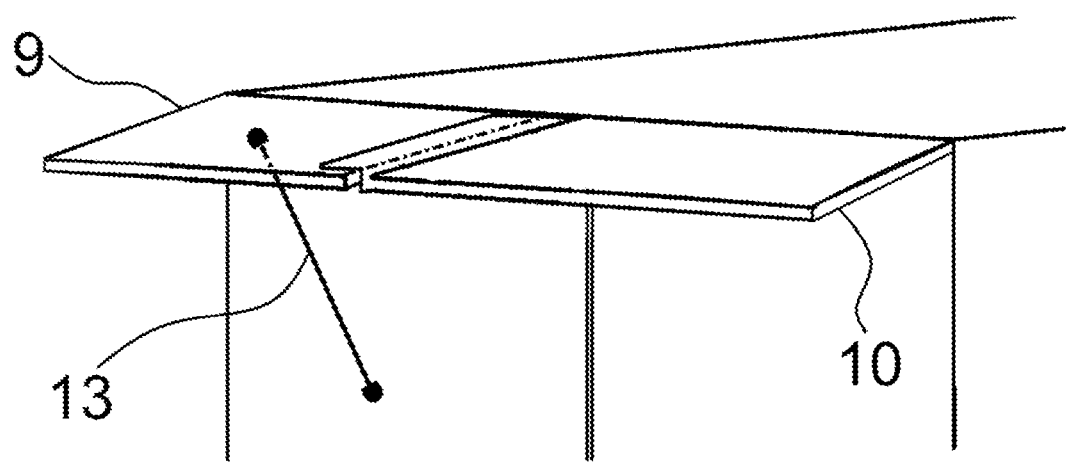
FIG. 2 shows a further perspective view of the rear spoiler device on the utility vehicle.

The rear 2 of a utility vehicle 1 is shown in FIGS. 1 and 2. The utility vehicle 1 here has a blunt end or a blunt rear and is, for example, a box-shaped truck. The utility vehicle 1 has a vehicle structure 3 which, at the rear 2, forms, for example, a portal, and furthermore two side walls 4, of which, in the perspective illustrations, the right side wall 4 and a roof surface 5 are seen.

A rear spoiler device 8 which has, on the left, a first roof air-guiding element 9 and, on the right, a second roof air-guiding element 10 is provided at the rear 2. The roof air-guiding elements 9, 10 are formed, for example, from a plastic material and, as shown in the figures, are flat, or else may be somewhat curved. The roof air-guiding elements 9, 10 are pivotable, or may be swung out between a basic position, in which they lie against the rear doors 6, 7, and a driving position. In the driving position shown in FIGS. 1 and 2, the first roof air-guiding element 9 and the second roof air-guiding element 10 provide an aerodynamic extension of the contour of the roof surface 5 rearward, and are inclined downward somewhat in relation to the horizontal. In addition, side air-guiding elements, not shown here in the figures, may also be provided on the utility vehicle 1. The left roof air-guiding element 9 and the right roof air-guiding element 10 are, for example, each attached to their respective rear doors 6, 7 using a hinge device, and are therefore pivotable on a pivot axis A between the driving position and basic position.

The roof air-guiding elements 9 and 10, therefore, respectively have a front edge 9a, 10a which lies on or within a region of the roof surface 5, and also a rear end 9b, 10b which points rearward and downward in the driving position shown. In this case, the rear edges 9b, 10b preferably have a shorter width than the front edges 9a, 10a in order to satisfy the desired aerodynamic properties. The adjustment device 13 provided according to FIG. 1 is a pull-push strut, which adjusts the left roof air-guiding element 9 and may be locked to the left vehicle door 6, e.g. in the driving position. In addition to mechanical or manual adjustments of this type, for example, pneumatic or electric adjustment devices are also possible.

A coupling device 15, which couples the pivoting movement or folding movement of the roof air-guiding elements 9, 10, is provided between the roof air-guiding elements 9, 10. The coupling device 15 is configured such that the left roof air-guiding element 9 is adjustable by the user via the adjustment device 13 and carries along the right roof air-guiding element 10 during the adjustment upward into the driving position. A dedicated adjustment device for the right roof air-guiding element 10 is therefore not provided; the adjustment into the driving position takes place via the coupling device, i.e. by being carried along with the adjusted left roof air-guiding element 9. The adjustment back to the basic, folded position takes place automatically because of gravity, i.e. when the left roof air-guiding element 9 is pivoted back or let down by the adjustment device 13, the right roof air-guiding element 10 automatically drops downward.

The coupling device 15 is preferably provided here as an extension of the left roof air-guiding element 9 beyond the center, i.e. to the right. The coupling device 15 therefore extends beyond the center line of symmetry or the opening line of the rear doors and lies below an inner edge of the right roof air-guiding element 10 (near the inner lateral edge 10d, for example). In this example, the coupling device 15 is a fixed part of the left roof air-guiding element 9, for example, as a plastic extension, or as an additional profile attached to the left roof air-guiding element 9.

Figure 3:
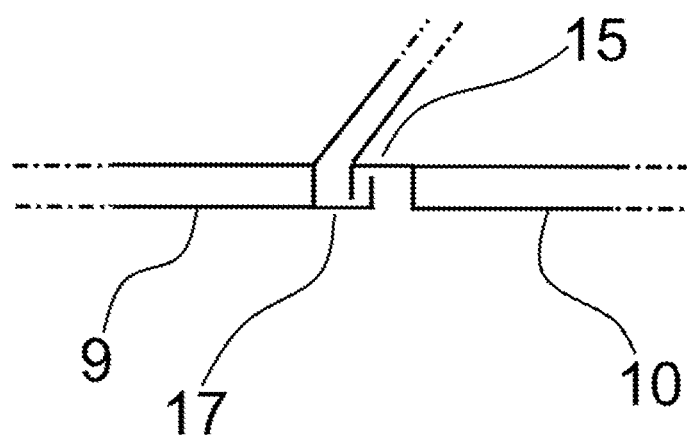
FIG. 3 shows the coupling of the roof air-guiding elements according to one embodiment of the invention.

According to the embodiment of FIG. 3, a mating coupling device 17, for example in the form of a mating profile, engages the coupling device 15, and is provided on the passive, i.e. right, roof air-guiding element 10. According to FIG. 3, the coupling device 15 and the mating coupling device 17 are, for example, brackets, U-shaped profiles, or S-shaped profiles, which in each case project into each other or engage each other. This provides a high degree of rigidity of the coupling device 15 and mating coupling device 17, and also prevents the coupling device 15 from folding over or yielding. The coupling device 15 and mating coupling device 17 may therefore be, for example, plastic brackets, plastic strips, or U-shaped or S-shaped plastic profiles, and can be attached to the roof air-guiding elements 9, 10, e.g. by riveting, screwing or adhesive bonding. This also provides a direct and simple engagement of the two roof air-guiding elements in each other without, for example, hooks or locking structures, and therefore also provides an easy resetting movement back into the driving position.

In the basic position of the roof air-guiding elements 9, 10, first of all the right rear door 7 can be opened in the customary manner; the mating coupling device 17 lifts out of the coupling device 15 without leading to a delay or damage. Subsequently, the rear doors 7, 6 can each be pivoted open rearward and, for example, can also be pivoted outward and forward by approximately 270°, to lie against the side walls 4, wherein the rear doors 6, 7 can be fastened to the side wall 4 and the folded-in roof air-guiding element 9, 10 are in each case accommodated here between the rear doors 6, 7 and the side walls 4.

The design according to the invention of the roof air-guiding elements with the coupling device 15 and mating coupling device 17 therefore requires only a little outlay for production; the handling of the rear doors is not impaired and the installation operation is simplified.

While the above description constitutes the preferred embodiments of the present invention, it will be appreciated that the invention is susceptible to modification, variation and change without departing from the proper scope and fair meaning of the accompanying claims.

The invention claimed is:

1. A rear spoiler device (8) for a utility vehicle (1), the rear spoiler device (8) comprising:
a first roof air-guiding element (9) configured to be attachable to a first rear door (6),
a second roof air-guiding element (10) configured to be attachable to a second rear door (7), wherein the first roof air-guiding element and the second roof air-guiding element (9, 10) are configured to be adjustable between a folded-in basic position and a driving position that aerodynamically extends a contour of a roof surface (5), an adjustment device (13) configured to adjust the first roof air-guiding element (9) between the folded-in basic position and the driving position,-
further comprising a coupling device (15) configured to couple a pivoting movement of the first roof air-guiding element to the second roof air-guiding element (9, 10), wherein the coupling device (15) is disposed on the first roof air-guiding element (9) and projects under the second roof air-guiding element (10).

2. The rear spoiler device (8) as claimed in claim 1, wherein the second roof air-guiding element (10) is configured to be carried along by the first roof air-guiding element (9) during the pivoting movement of the first roof air-guiding element from the folded-in basic position into the driving position.

3. The rear spoiler device (8) as claimed in claim 1, wherein the coupling device (15) projects under an inner region (16) of the second roof air-guiding element (10).

4. The rear spoiler device (8) as claimed in claim 1, the second roof air-guiding element (10) comprising:
a front end (10a) configured to lie against a rear door (7), wherein the front end has a pivot axis (A);
a rear edge (10b;
an outer lateral edge (10c); and
an inner lateral edge (10d);
wherein the coupling device (15) carries along at least one of the inner lateral edge (10d) and an inner region of the second roof air-guiding element (10).

5. The rear spoiler device (8) as claimed in claim 4, wherein the coupling device (15) carries along the second roof air-guiding element (10) along an entire length of the inner lateral edge (10d).

6. A rear spoiler device (8) for a utility vehicle (1), the rear spoiler device (8) comprising:
a first roof air-guiding element (9) configured to be attachable to a first rear door (6),
a second roof air-guiding element (10) configured to be attachable to a second rear door (7), wherein the first roof air-guiding element and the second roof air-guiding element (9, 10) are configured to be adjustable between a folded-in basic position and a driving position that aerodynamically extends a contour of a roof surface (5),
an adjustment device (13) configured to adjust the first roof air-guiding element (9) between the folded-in basic position and the driving position,
further comprising a coupling device (15) configured to couple a pivoting movement of the first roof air-guiding element to the second roof air-guiding element (9, 10)
further comprising a mating coupling device (17) on the second roof air-guiding element (10), wherein the mating coupling device is configured to engage the coupling device and be carried along by the coupling device (15).

7. The rear spoiler device (8) as claimed in claim 6, wherein each of the coupling device (15) and the mating coupling device (17) has an angled or U-shaped profile, and the coupling device and the mating coupling device are configured to engage one another in an interlocking manner.

8. The rear spoiler device as claimed in claim 1, wherein the first roof air-guiding element (9) is located on a left side of the utility vehicle and the second roof air-guiding element (10) is located on a right side of the utility vehicle.

9. The rear spoiler device as claimed in claim 1, wherein the adjustment device (13) is a mechanical adjustment device configured to adjust the first roof air-guiding element selected from the group consisting of: a pull-push rod, a pneumatic adjustment device, and an electric adjustment device.

10. The rear spoiler device (8) as claimed in claim 1, wherein-the rear spoiler device is attached to the first and second rear doors (6, 7), wherein the first roof air-guiding element (9) is attached to a first rear door (6) and the second roof air-guiding element (10) is attached to a second rear door (7) of the utility vehicle (1).

11. The rear spoiler device (8) as claimed in claim 10, wherein the first roof air-guiding and the second roof air-guiding element are configured to lie flat on the first and second rear doors in the folded-in basic position (9, 10).

12. The rear spoiler device (8) as claimed in claim 10, wherein the first roof air-guiding element (9) and the second roof air-guiding element (10) each have a hinge device attached to a respective rear door (6, 7) configured to form a pivot axis (A).

13. The rear spoiler device as claimed in claim 1, wherein the first roof air-guiding element and the second roof air-guiding element (9, 10) are formed from a plastic.

14. A utility vehicle (1) having a rear spoiler device (8) as claimed in claim 1, wherein, in the folded-in basic position, the first and second rear doors (6, 7) are configured to be openable one after the other, the first and second rear doors are pivotable in an outward and a forward direction by approximately 270°, and the first and second rear doors lie against a respective side wall (4) of the utility vehicle (1), wherein the rear spoiler device (8) is configured to be accommodated between the first and second rear-doors (6, 7) and the respective side wall (4).

15. The utility vehicle (1) as claimed in claim 14, wherein the second rear door (7) is configured to be openable first and the first rear door (6) is configured to be openable subsequently to the second rear door.

16. A rear spoiler device (8) for a utility vehicle (1), the rear spoiler device (8) comprising:
a first roof air-guiding element (9) configured to be attachable to a first rear door (6),
a second roof air-guiding element (10) configured to be attachable to a second rear door (7), wherein the first roof air-guiding element and the second roof air-guiding element (9, 10) are configured to be adjustable between a folded-in basic position and a driving position that aerodynamically extends a contour of a roof surface (5),
an adjustment device (13) configured to adjust the first roof air-guiding element (9) between the folded-in basic position and the driving position,
further comprising a coupling device (15) configured to couple a pivoting movement of the first roof air-guiding element to the second roof air-guiding element (9, 10), wherein the adjustment device (13) is configured to adjust only the first roof air-guiding element (9), and the second roof air-guiding element is configured to be passively adjusted via the first roof air-guiding element (9).

17. The rear spoiler device (8) as claimed in claim 16, wherein the coupling device (15) is disposed on the first roof air-guiding element (9) and projects under the second roof air-guiding element (10).

* * * * *